Oct. 9, 1962                  H. FEINDT                3,058,045
ELECTRIC MOTOR WITH SPEED RESPONSIVE SWITCH
Filed March 29, 1961
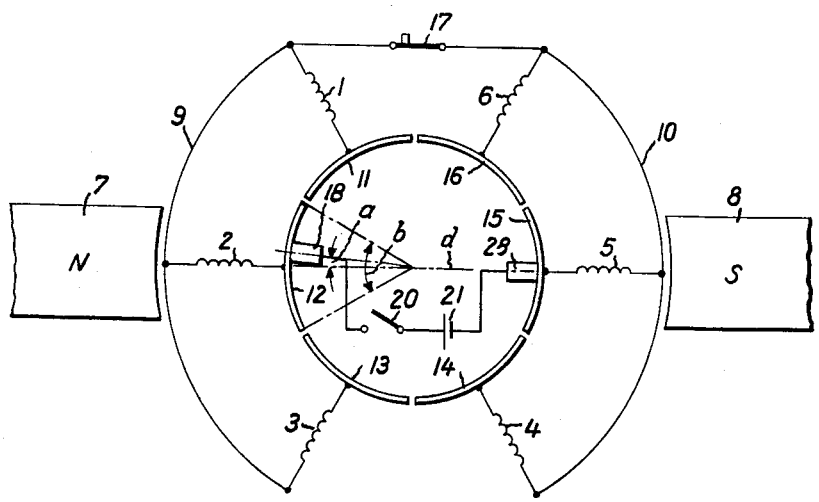
Inventor:
Heinrich Feindt
by: George B. Spencer
attorney ial horsepower D.C.
United States Patent Office 3,058,045
Patented Oct. 9, 1962

3,058,045
ELECTRIC MOTOR WITH SPEED RESPONSIVE SWITCH
Heinrich Feindt, Berlin-Grunewald, Germany, assignor to Licentia Patent-Verwaltungs-G.m.b.H., Frankfurt am Main, Germany
Filed Mar. 29, 1961, Ser. No. 99,291
Claims priority, application Germany Apr. 11, 1960
3 Claims. (Cl. 318—325)

The present invention relates to motors.

More particularly, the present invention relates to D.C. motors, especially small fractional horsepower motors, which incorporate a rotational speed responsive switch for controlling the speed of the motor.

There exist very small fractional horsepower D.C. motors whose rotational speed is regulated by a centrifugal switch arranged at the neutral point of the rotor windings. The three stator windings are controlled by two movable contacts. The advantage of such an arrangement is that the centrifugal switch breaks the entire circuit of the rotor, but is called upon to interrupt only the periodically disrupted direct current which occurs after commutation, so that contact scorching is substantially reduced as compared to conventional arrangements.

If more than three windings are used, two movable contacts are no longer enough, unless one is satisfied with incomplete current interruption, i.e., if there is no objection to the fact that, upon opening of the switch, some of the windings will have current flowing therethrough.

It is, therefore, a primary object of the present invention to provide a D.C. motor which is equipped with a rotational speed responsive switch having but one set of cooperating contacts and nevertheless able to interrupt the flow of current through all of the rotor windings even though there are more than three windings.

With the above object in view, the present invention resides basically in a D.C. motor which incorporates a rotor having an even number of rotor windings divided into two groups having equal numbers of windings, the windings of each group being star-connected so as to have a common neutral point, and a rotational speed responsive switch carried by the rotor and having two contacts connected, respectively, to the neutral points of the two groups of windings. In this way, not only may the number of windings be increased to as many as desired, but the rotational speed responsive switch will be a simple device having but two cooperating contacts, i.e., one movable and one stationary contact. Such an arrangement is obviously less expensive than a multiple-contact switch, to say nothing of the delicate adjustment required for multiple-contact switches in order to make certain that all circuits will be interrupted simultaneously.

Additional objects and advantages of the present invention will become apparent upon consideration of the following description when taken in conjunction with the accompanying drawing in which the single figure is a schematic illustration of the present invention.

Referring now to the drawing, the same shows the permanent magnets 7 and 8 of a stator which, for the sake of simplicity, is itself not illustrated. To facilitate the illustration of the invention, the rotor is shown "inverted," in a manner of speaking, in that the brushes 18 and 28 are shown interiorly of the commutator segments 11, 12, 13, 14, 15, 16, and the rotor windings 1, 2, 3, 4, 5, 6 are shown exteriorly of the segments, it being understood, however, that the motor commutator structure is conventional. As is apparent from the drawing, the commutator segments are of the same size.

The rotor windings are divided into two groups, one group being constituted by the windings 1, 2, 3, and the other group by the windings 4, 5, 6. The windings 1, 2, 3, of the first group are star-connected together by a lead 9 and the windings 4, 5, 6, of the second group are star-connected together by a lead 10. The two leads, which constitute neutral points for the windings of the particular group, are connected to a rotational speed responsive or centrifugal switch 17 which thus constitutes the neutral point for the entire rotor.

The brushes 18 and 28 are connected to a source 21 of direct current, as for example, an accumulator or a dry cell, via a main switch 20.

When the parts occupy the position shown in the drawing, the motor is at rest. If the switch 20 is then closed, current will flow from the D.C. source 21 and through the rotor windings, thereby developing a torque. The motor is thus set into rotation and will accelerate until it attains a rotational speed at which the centrifugal switch 17 opens. The current is then interrupted completely, i.e., the interruption is such that no current whatever will flow through any of the coils. Assuming, for instance, that the rotor, at the instant at which the switch 17 opens, is in the position shown in the drawing, the windings 1, 3, 4, and 6 will be completely disconnected from the source 21, i.e., both terminals of each of these four windings will be out of electrical contact with the source 21; the windings 2 and 5 will not be completely disconnected from the source 21 in that only one terminal of each of these windings is disconnected from the source 21, but it is clear that no current can flow through these two last-mentioned windings if the switch 17 is open. In this way, the current flow through all of the rotor windings will be interrupted by a rotational speed responsive switch having but a single pair of cooperating contacts.

It will be noted that the brushes 18 and 28 are arranged non-symmetrically with respect to a diameter d of the rotor by an angle a which is less than the angle b subtended by one of the commutator segments, preferably less than one quarter of this angle b. As a result, the motor will readily start irrespective of the position of the rotor. It will be appreciated that if the brushes were arranged on the same diameter and the commutator segments were distributed symmetrically about the circumference, as shown, then the motor would not start when each of the two brushes short-circuits two windings, because this would produce symmetric torques and counter-torques.

It will be understood that the above description of the present invention is susceptible to various modifications, changes, and adaptations, and the same are intended to be comprehended within the meaning and range of equivalents of the appended claims. For example, the rotor may have four windings, or it may have eight or a higher even number of windings, with the windings always being divided into two groups composed of equal numbers of windings which are star-connected and thus have a common neutral point, the contacts of the switch 17 being connected to the two neutral points, respectively.

The present invention has been described with particular reference to very small fractional horsepower motors. The application of the present invention, however, is not limited to such motors but may be used in conjunction with larger motors as well.

Nor is it essential that the windings of each group be consecutive, as shown in the illustrated embodiment. Instead, any suitable sequence of windings may be selected provided only that the windings are divided into groups composed of equal numbers of windings.

I claim:

1. A D.C. motor comprising, in combination: a rotor having an even number of rotor windings divided into two groups having equal numbers of windings, the windings of each group being star-connected so as to have a common neutral point, a rotational speed responsive switch carried by said rotor and having two contacts connected, respectively, to said neutral points of said two groups of windings, and a plurality of commutator segments corresponding in number to the number of rotor windings; and a pair of stationary brushes cooperating with said commutator segments, said brushes being arranged non-symmetrically with respect to a diameter of said rotor by an angle which is less than that subtended by one of said commutator segments.

2. A D.C. motor as defined in claim 1 wherein said angle is less than one quarter of that subtended by one of said commutator segments.

3. A D.C. motor as defined in claim 1 wherein said commutator segments are of the same size.

References Cited in the file of this patent
UNITED STATES PATENTS
2,936,412     Jin ------------------- May 10, 1960